United States Patent

Gauchon

[19]

[11] Patent Number: 6,116,405
[45] Date of Patent: Sep. 12, 2000

[54] SWITCHING DEVICE MODIFYING CONDITIONS UNDER WHICH A LOAD TRAVELS ALONG A CONVEYOR

[75] Inventor: Christian Gauchon, Moingt, France

[73] Assignee: Rouleaux Pack SA, Boen sur Lignon, France

[21] Appl. No.: 09/293,929

[22] Filed: Apr. 19, 1999

[30] Foreign Application Priority Data

Apr. 21, 1998 [FR] France .................................. 98 05218

[51] Int. Cl.[7] .................................................. B65G 47/46
[52] U.S. Cl. ...................................................... 198/370.09
[58] Field of Search ...................... 198/370.01, 370.09, 198/371.3; 193/35 MD

[56] References Cited

U.S. PATENT DOCUMENTS

| 3,356,236 | 12/1967 | Shaw et al. | 198/370.09 |
| 3,370,685 | 2/1968 | Guilie | 198/370.09 |
| 3,964,588 | 6/1976 | Kornylak | 193/35 MD |
| 5,699,892 | 12/1997 | Shyr et al. | 198/370.09 |

FOREIGN PATENT DOCUMENTS 0 781 717 A1  7/1997  European Pat. Off. .

*Primary Examiner*—James R. Bidwell
*Attorney, Agent, or Firm*—Oliff & Berridge, PLC

[57] ABSTRACT

A switching device, for use with a conveyor, having at least two juxtaposed driven switching rolls on the periphery of each of which several turns of a chain with rollers are wound and attached. The axis of rotation of the rollers form an angle in a range between 0 degrees to 60 degrees relative to the axis of rotation of the switching rolls. Each roller is free to rotate relative to a corresponding link, and projects beyond an outer diameter of the link to contact a load in a support plane defined by other rolls of the conveyor.

16 Claims, 4 Drawing Sheets

SWITCHING DEVICE MODIFYING CONDITIONS UNDER WHICH A LOAD TRAVELS ALONG A CONVEYOR

BACKGROUND OF THE INVENTION

The invention relates to conveyors having a frame with horizontal rolls parallel to each other and mounted freely to the frame where the rolls are driven to rotate in at least one direction to move loads placed upon the rolls. In particular, the invention relates to rolls having a connected flexible series of a plurality of links and rollers that modify the conditions under which the loads travel along the conveyor.

Presently, the change in direction of the load trajectory requires the use of curved conveyors whose curvatures depend on the maximum length of the loads. Accordingly, such conveyors take up a great deal of space.

For right-angle changes in direction, for example, between two perpendicular conveyors, a plate must be provided in the transfer area to receive the loads from the first conveyor. The loads must first be slowed down before being stopped. A retractable pusher transfers the load to the other conveyor, where the speed of the load is increased. Such an operation increases the time necessary to move the loads.

SUMMARY OF THE INVENTION

An aspect of the invention is to overcome these drawbacks by providing a space-saving switching device that alters the conditions under which the loads move along a conveyor, particularly a direction of movement, without interrupting the transfer of the loads.

The switching device according to the invention has at least two driven juxtaposed switching rolls. At the periphery of each switching roll, several rings or turns of a roller chain are wound and mounted. The axis of rotation of the rollers form an angle of inclination of 0 degrees to 60 degrees to the axis of rotation of the switching rolls. Each of the rollers are free to rotate relative to a corresponding link and projects beyond an outer diameter of the link to contact the load in a support plane defined by normal rolls of the conveyor.

When the load carried by the normal rolls arrives at the switching rolls, the switching rolls behave like the normal rolls if there is no obstacle to prevent the load from moving along its current path. However, if the load is subjected to a restraining force and the linear speed of the load becomes less than that of the rollers, the rollers contacting the load transmit a transverse force to the load due to the angle of inclination of the rollers. The moving path of the load is modified to move the load transversely off the conveyor at a speed dependent upon the angle of inclination of the rollers.

The load-restraining means may be a fixed stop, a retractable stop, or another pair of switching rolls located downstream of the first pair of switching rolls. The second pair of switching rolls also have a connected flexible series of a plurality of links and rollers with a winding direction that is opposite of those of the first pair of switching rolls. The second pair of switching rolls are connected to different rotational drive means than the first pair of switching rolls, whose direction of rotation is reversible.

In another embodiment, the switching device may have at least two switching rolls on which the links and rollers are wound with an angle of inclination of zero degrees and form rings on the switching rolls. The switching rolls are connected to different rotational drive means than the normal rolls and are able to drive the switching rolls at a different speed than the normal rolls to adjust the speed of the loads as needed.

In yet another embodiment, the switching device may have two parallel switching rolls on each of which are two sections of links and rollers wound with the same angle of inclination, but have a different winding direction. In particular, the upstream switching roll has a winding direction from the outside to the middle of the switching roll, and the downstream switching roll has a winding direction from the middle to the outside of the switching roll. The two switching rolls are connected to different rotational drive means of which at least that of the downstream switching roll is reversible in direction so that, when the switching roll rotates in a direction opposite to that of the upstream switching roll, the downstream switching roll causes the load to rotate about its own axis. As such, the load is able to pivot on the downstream switching roll, for example, to orient the load upstream of a pickup device, such as a handling device, or prior to the load being transferred to a transverse conveyor.

These and other aspects of the invention will be described in or be apparent from the following description of the preferred embodiments.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 6:
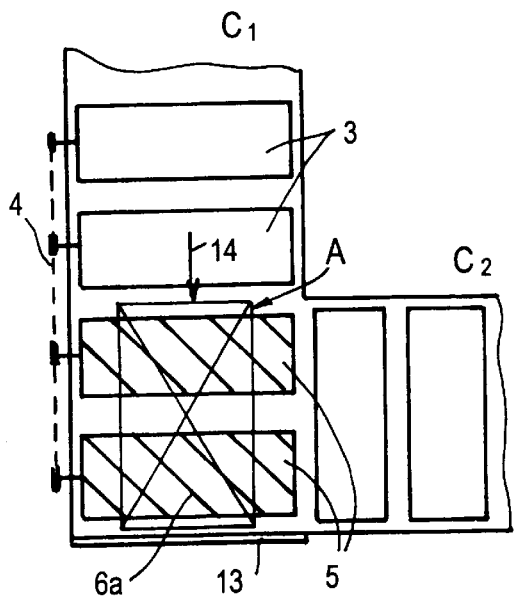
FIG. 6 is a top plane view showing a first embodiment of the switching device, according to the invention.

As shown in FIG. 6, the conveyor includes a plurality of normal roll conveyors C1, C2, . . . Cn having a frame 2 supporting a plurality of normal rolls 3. The normal rolls 3 are parallel to each other and horizontally mounted to the frame 2 to rotate freely. The normal rolls 3 are connected to means 4 that may rotationally drive the normal rolls 3 at the same speed or at a different speed. The drive means 4 may be made of, for example, pinions mounted on a shaft of each normal roll 3 that mesh with chains or toothed belts.

The switching device according to the invention to be included in a conveyor of the type discussed above has at least two switching rolls 5 having a diameter smaller than an outer diameter of the normal rolls 3. Each switching roll 5 supports a chain 6 with rollers 7 wound on the periphery of the switching roll 5. As shown in FIGS. 1, 6–10 and 12, each chain 6 may be wound helically on a switching roll 5 extending from one end of the switching roll 5 to the other end. The helical angle a can range from zero degrees to 60 degrees relative to an axis of the switching roll 5. The helix can be a right hand helix going from left to right or a left hand helix going from right to left, depending on the use of the switching device.

Figure 1:
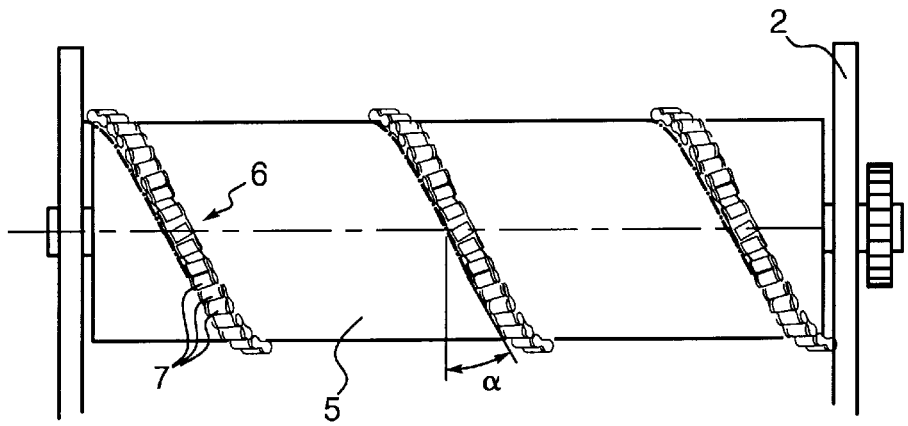
FIG. 1 is a partial front view of a switching roll equipped with a plurality of links and rollers to form a switching device, according to the invention, where the switching roll is attached to a frame of a conveyor.
Figure 2:
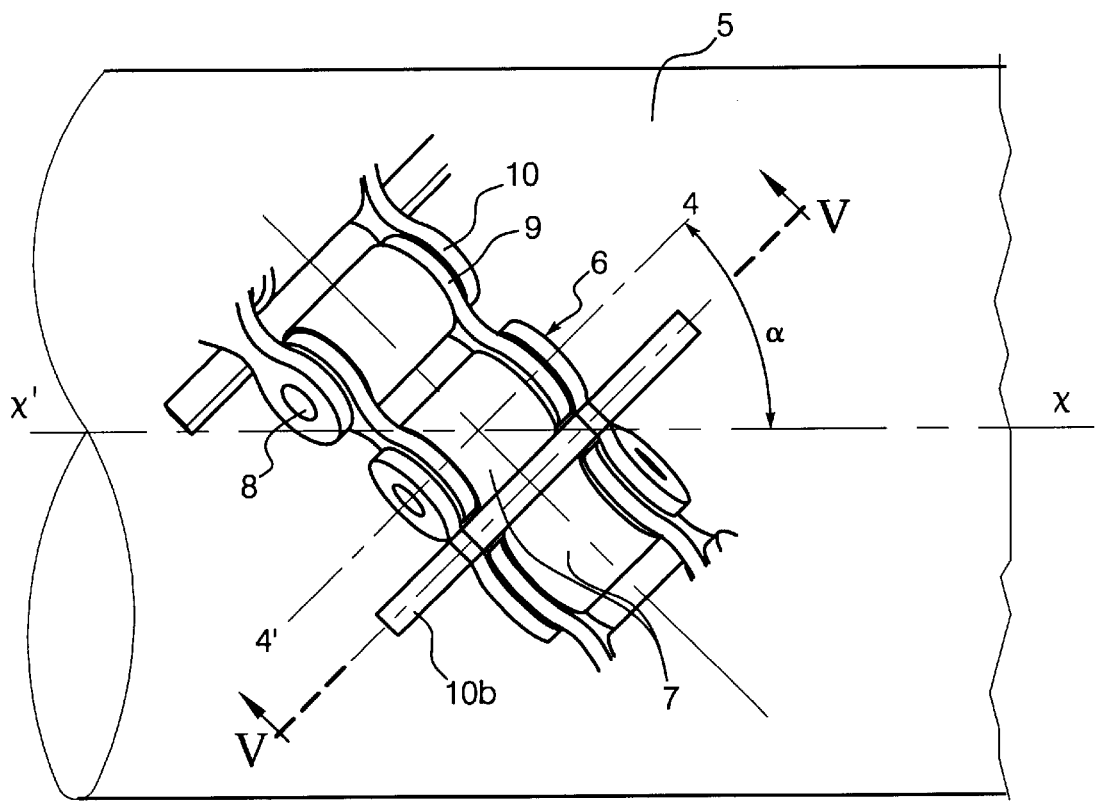
FIG. 2 is a partial enlarged plane view of the switching device.

As shown in FIG. 2, each roller 7 of chain 6 is mounted to freely rotate about an axis 8 passing through the bearings of an inner link 9 and the bearings of an outer link 10 to which the roller 7 is riveted. The geometric axis y'–y of each axes 8 is inclined by the helical angle a relative to the lengthwise axis x'–x of the switching roll 5, as shown in FIG. 2.

Figure 3:
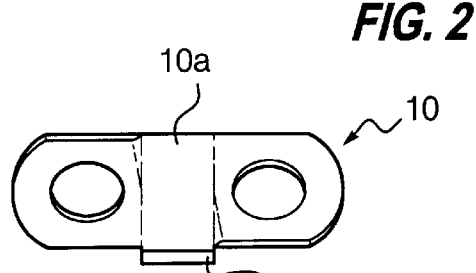
FIG. 3 is a side elevation of an outer link of the switching device.
Figure 4:
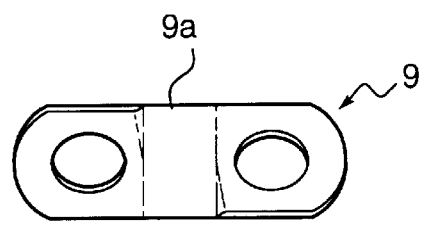
FIG. 4 is a side elevation of an inner link of the switching device.

To facilitate winding of the chain 6 around each switching roll 5, each of the outer links 10 and inner links 9 thereof is twisted, as shown in FIGS. 3 and 4, respectively. The twist or warp angle is determined according to the helical winding angle a of the chain 6 on the switching roll 5 and the outside diameter of the switching roll 5. FIGS. 3 and 4 show the twist angle affects only the ends of each of link 9 and 10, which retain a non-twisted center part 9a and 10a, respectively.

The center part 10a of each outer link 10 is integral with a bent tab 10b, which projects outward and downward when the link 10 is assembled so that the link 10 can be fastened to a wall of the switching roll 5. When the switching roll 5 is made of metal, the link may be joined by welding. The link 10 can also be joined to a switching roll 5 made of synthetic material by gluing.

Figure 5:
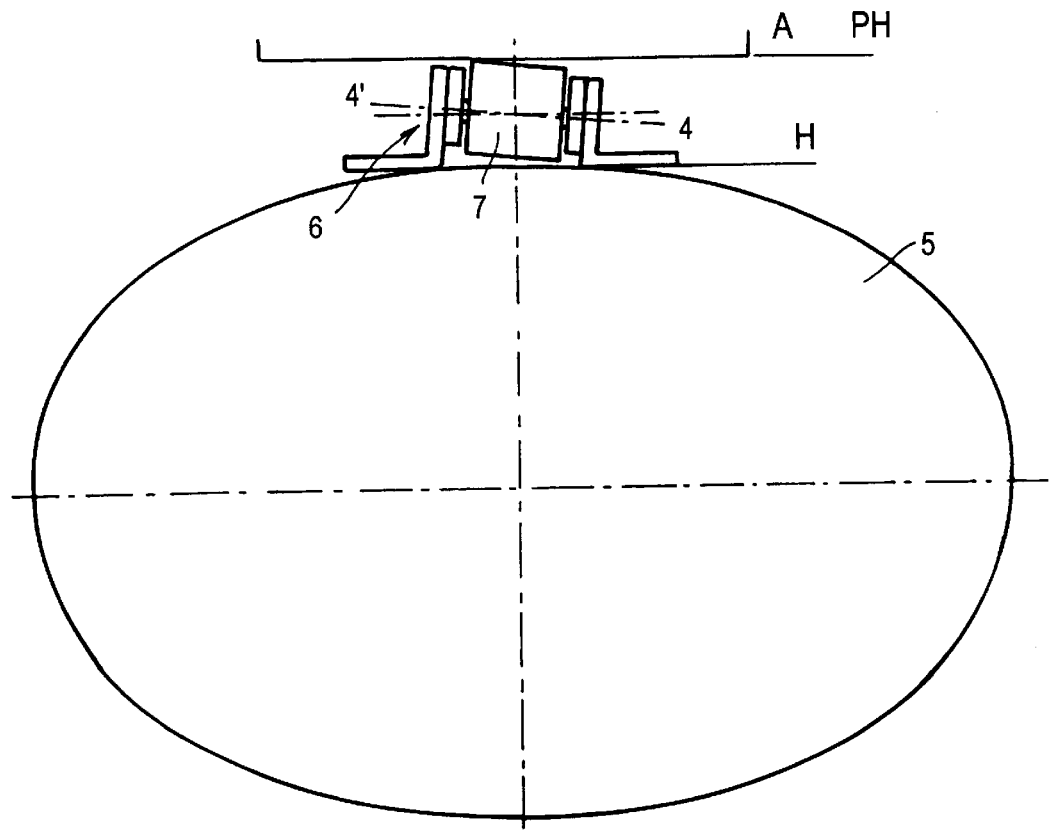
FIG. 5 is a cross-sectional view of the switching device on a switching roll while engaging a load taken along line 5—5' in FIG. 2.

FIG. 5 shows the dimensions of the switching roll 5 and each roller 7 are determined such that each roller 7 comes in contact with the load A substantially in the horizontal plane PH in which the load A contacts the normal rolls 3 of the conveyor. FIG. 5 also shows that, due to the twist angle conferred on the inner and outer links 9 and 10, when a roller 7 is in the contact position with load A, the axis of rotation y'–y of the roller 7 is inclined relative to the diametral horizontal plane H of the switching roll 5.

FIG. 6 shows an exemplary use of the switching device, according to the invention, as a switch between a first conveyor C1 and a second conveyor C2 located transversely with respect to the first conveyor C1. As can be seen, the switching device may have two switching rolls 5. The switching rolls 5 are substantially similar, namely both may have roller chains 6 wound in a substantially common direction with a substantially common winding angle a. The chains 6 are illustrated with bars 6a representing the turns of the chains 6. The normal and switching rolls 3 and 5 are connected to the rotational drive means 4 which, in this embodiment, are shared in common by the normal and switching rolls 3 and 5.

The switching device 5 is disposed at the end of the first conveyor C1 and is associated with a fixed stop 13, disposed downstream thereof and at the end of the first conveyor C1. Under these conditions, when a load A is moved in the direction of arrow 14 by the first conveyor C1 and arrives at the switching rolls 5, the load A is moved lengthwise by the switching rolls 5 in the same way as by the normal rolls 3. On the other hand, when the load A abuts the stop 13, the load A is acted upon by the rollers 7, which roll against a lower surface of the load A, and apply a transverse force pushing the load A rightward if the helix of chains 6 is a right hand helix, as shown, or leftward if the helix is a left hand helix (not shown). In other words, the switching rolls 5 of the switching device instantly cause the load A to be transferred to the second conveyor C2 as soon as the load A is subjected to a force opposing the advance of the load A.

Figure 7:
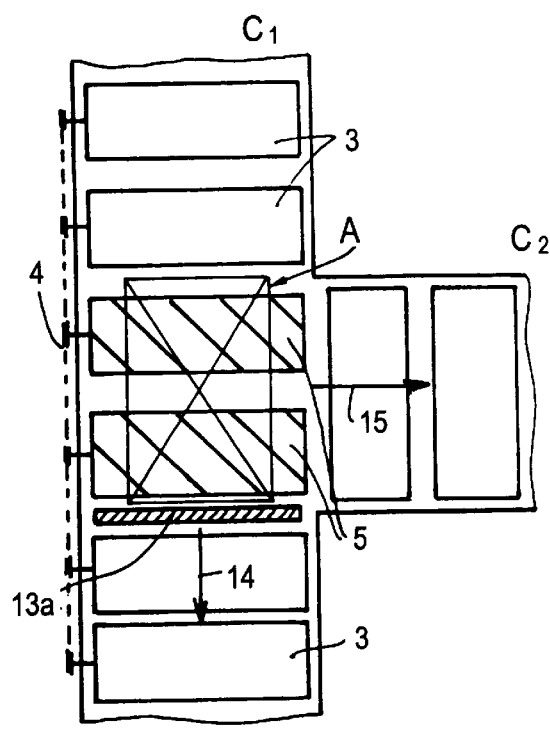
FIG. 7 is a top plane view showing a second embodiment of the switching device, according to the invention.

In another embodiment shown in FIG. 7, the switching device, according to the invention, is not disposed at the end of the first conveyor C1, but rather is incorporated into a portion thereof, so that the first conveyor C1 extends beyond the switching device. The first conveyor C1 is equipped with a stop 13a disposed downstream of the switching device and is vertically retractable relative to the support plane. Under these conditions, if the stop 13a is in a retracted position, i.e., below the support plane of the load A on the first conveyor C1, the load A traveling on the first conveyor C1 arriving at the switching rolls 5 continues along the straight-line path, represented by arrow 14. On the other hand, if the stop 13a is moved vertically into the path of load A, i.e., extends above the support plane, the load A is moved transversely onto the second conveyor C2, as shown by arrow 15. The combination of the switching device, according to the invention, with a retractable stop 13a allows simple remote-controllable switching that takes up little space.

Figure 8:
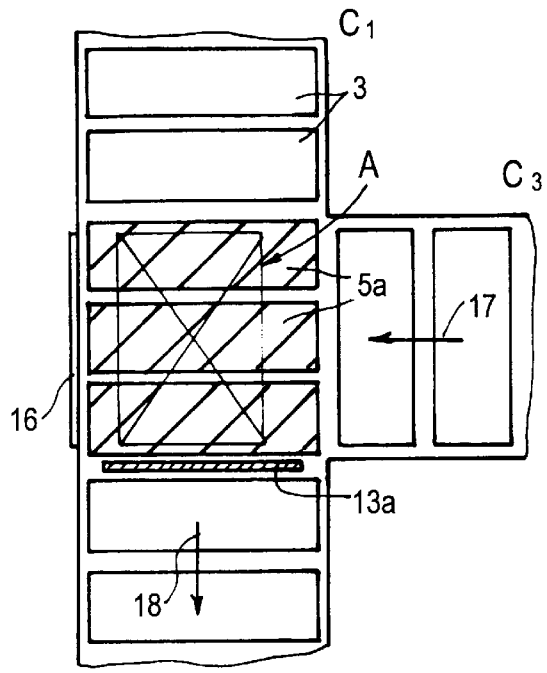
FIG. 8 is a top plane view showing a third embodiment of the switching device, according to the invention.

In another embodiment of the switching device, according to the invention, as shown in FIG. 8, the first conveyor C1 is continuous and is associated with a transverse feed conveyor C3. The switching device has three switching rolls 5a having chains 6 with rollers 7 that are wound with the same helical angle a and with left hand helices. The switching rolls 5a are driven in the same direction and at the same speed as the normal rolls 3 of the first conveyor C1. The switching device also has a vertically retractable stop 13a disposed transversely to the movement path of the first conveyor C1 downstream of the switching rolls 5a and a fixed stop 16 disposed at an edge of the first conveyor C1, which is at the end of the path of the transverse feed conveyor C3.

Any load A moved by the transverse feed conveyor C3 in the direction of arrow 17 arriving on the first conveyor C1 is moved in the direction of arrow 18 by the switching rolls 5a and abuts the retractable stop 13a, if it is extended above the support plane. Under these conditions, the rollers 7 of the switching rolls 5a move the load A in the direction of arrow 17 until the load A contacts the stop 16. Then, the extended stop 13a is lowered so that the stop 13a releases the load A, which is then driven by the switching rolls 5a in the direction of arrow 18.

It will be noted that if a contact or sensor is positioned near the stop 16 to detect the presence of the load A, the retractable stop 13a can be lowered automatically. Obviously, the same applies to raising the stop 13a, as this can be triggered by passage of the load A over a contact or sensor disposed on the transverse feed conveyor C3.

Figure 9:
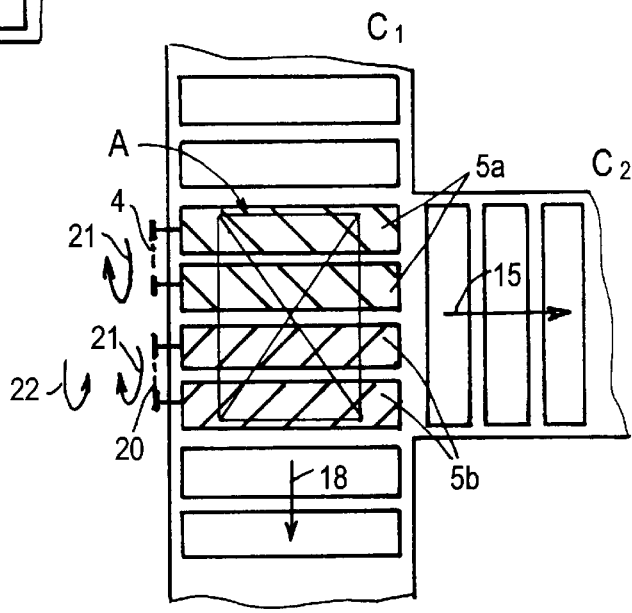
FIG. 9 is a top plane view showing a fourth embodiment of the switching device, according to the invention.

In yet another embodiment of the switching device, according to the invention, as shown in FIG. 9, the means to restrain the load A, represented thus far by stops 13, 13a and 16, are replaced by two additional switching rolls 5b disposed adjacent to and downstream of the first two switching rolls 5a. On the switching rolls 5b, the chains 6 with rollers 7 are wound in the reverse direction to the chains 6 on the switching rolls 5a and, for example, wound with a left hand helix if the switching rolls 5a have a right hand helix. Also, the two switching rolls 5b are connected to drive means 20 that is separate from the drive means 4 rotationally driving the two switching rolls 5a and additionally are reversible, namely can drive the switching rolls 5b in either direction.

When a load A arrives at the switching device, if the switching rolls 5b are turning in the same direction as the switching rolls 5a, namely in the direction of arrows 21, the load A passes over the switching rolls 5a and 5b without being redirected and hence continues along the path represented by arrow 18. On the other hand, if the switching rolls 5b are driven rotationally in the direction of arrow 22, the load A is stopped. As a result, the rollers 7 of the switching rolls 5b, like the rollers 7 of the switching rolls 5a, apply a force to the load A in the direction of arrow 15 which redirects the load onto the conveyor C2.

The fact that the movement of the load A is being slowed or altered by the switching rolls 5b with roller chains 6 instead of stops 13, 13a and 16, as shown in FIGS. 6–8, for example, has the advantage of stopping the load A more gradually. This switching device can thus be used with loads A containing fragile objects.

Figure 10:
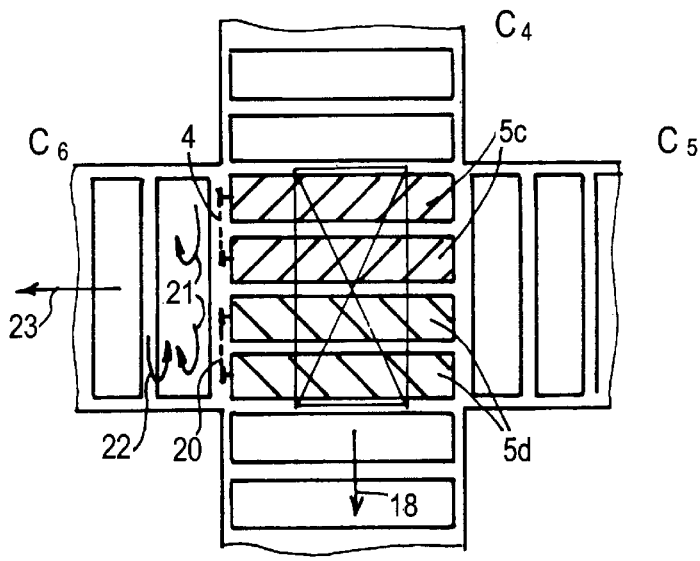
FIG. 10 is a top plane view showing a fifth embodiment of the switching device, according to the invention.

FIG. 10 shows yet another embodiment of the switching device, according to the invention, as a switch for crosswise connection between a first conveyor C4 and a first lateral conveyor C5 extending beyond the first conveyor C4 by a second lateral conveyor C6.

The switching device includes two pairs of switching rolls 5c and 5d with rollers 7, namely the two switching rolls 5c each having a chain 6 with rollers 7 wound helically leftward and the two switching rolls 5d each have a chain 6 with roller 7 wound helically rightward. The switching rolls 5c are driven rotationally by the drive means 4 as those driving the normal rolls 3 of the first conveyor C4, while the switching rolls 5d are driven by separate and reversible drive means 20.

When the load A travels on the first conveyor C4 and reaches the switching rolls 5c and 5d, the load A continues on a straight-line path, represented by arrow 18, if the switching rolls 5d are turning in the direction of arrow 21, namely in the same direction as the normal rolls 3 of the first conveyor C4. On the other hand, the load A is transferred to the second lateral conveyor C6 if the switching rolls 5d are turning in the direction of arrow 22. Likewise, if the load A travels on the first lateral conveyor C5 and approaches the switching device, if the switching rolls 5d are turning in the direction of arrow 22, the load A continues along its path toward the second lateral conveyor C6 in the direction of arrow 23. If the switching rolls 5d are turning in the direction of arrow 21, the load A is pushed by rollers 7 onto the first conveyor C4 in the direction of arrow 18.

Figure 11:
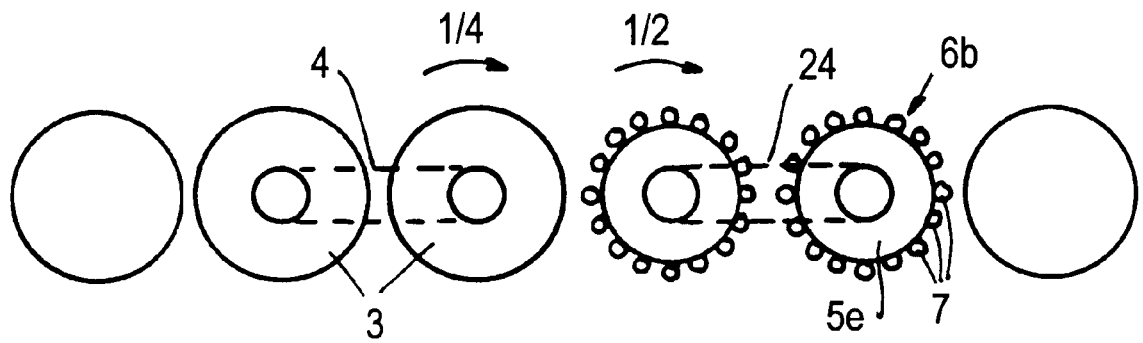
FIG. 11 is a cross-sectional side view of a sixth embodiment of the switching device, according to the invention.

In yet another embodiment, as shown in FIG. 11, the switching device, according to the invention, may brake or slow down the load A. The at least two switching rolls 5e have sections 6b of chains 6 which are wound on the switching rolls 5e at a helical angle of zero degrees relative to an axis of relation of the switching rolls 5e and form spaced rings. The axes of the rollers 7 are thus parallel to the axis of rotation of the switching rolls 5e. The switching rolls 5e are rotationally driven by drive means 24, which are independent for each switching roll 5e and independent of the drive means 4 that drive the normal rolls 3 of the conveyor rotationally. Each of the drive means 24 can drive one of the switching rolls 5e at a peripheral linear speed V2, which is different from the linear speed V1 of the normal rolls 3 and that of each of the following switching rolls 5e. If the peripheral linear speed V2 is less than the linear speed V1 and decreases as the switching rolls 5e move downstream, the switching rolls 5e gradually stop the speed of the load A without jolting it. On the other hand, if the peripheral linear speed V2 is greater than the linear speed V1, and increases for each switching roll 5e downstream of the preceding roll 5e, the switching rolls 5e gradually speed up the load A.

It will be noted that the same switching rolls 5e can slow down or alternatively speed up the load A as needed.

Figure 12:
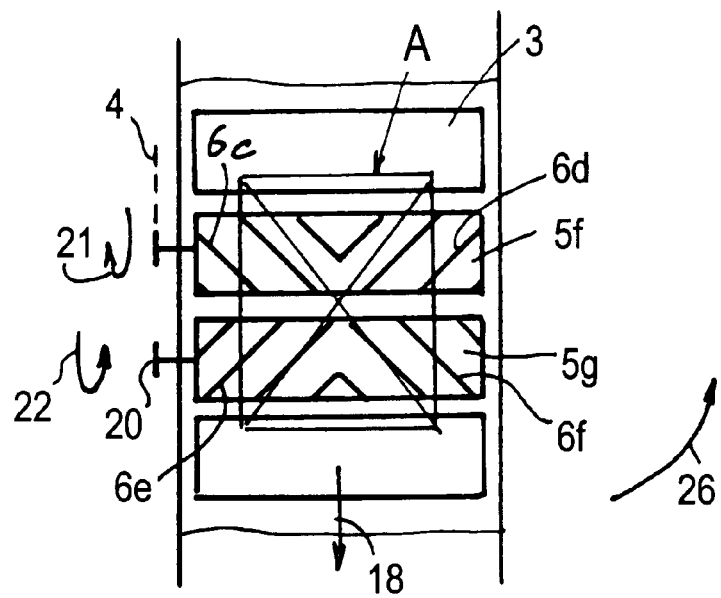
FIG. 12 is a top plane view showing the switching device according to the invention, where the switching device is used to rotate a load.

FIG. 12 shows another embodiment of the switching device, according to the invention, changing the orientation of a load A on a conveyor.

The switching device has at least two switching rolls, an upstream switching roll 5f and a downstream switching roll 5g, each of which has two sections of helically wound chains 6. In particular, on the left part of switching roll 5f, a right-wound section 6c and on the right part, a left-wound section 6d. On the left part of the switching roll 5g, a left-wound section 6e and on the right part, a right-wound section 6f. Upstream switching roll 5f, which is designed to pivot in the same direction and at the same speed as the normal rolls 3 of the conveyor, can be connected to the drive means 4 of the conveyor or have independent drive means (not shown). Downstream switching roll 5g is driven by the independent and reversible drive means 20.

When the downstream switching roll 5g is rotationally driven in the same direction as switching roll 5f, namely in the direction of arrow 21, the load A resting on the switching device is not subjected to any redirection and continues along the path in the direction of arrow 18. On the other hand, if the switching roll 5g is rotationally driven in the opposition direction to the switching roll 5f, namely in the direction of arrow 22, the rollers 7 contacting the bottom of the load A may stop the load A from moving and cause the load A to pivot on the switching roll 5g in the direction of arrow 26. As soon as the load A has pivoted through 90 degrees, the power supplied to the drive means 20 is reversed and the switching roll 5g is driven in the reverse direction to discharge the load A.

The rotation of the load A on the support plane can be over 180 degrees. It is useful, for example, to orient the load A in accordance with the functions provided by the next station or with the transfer of the load A to a transverse conveyor bringing the load A to a station requiring a different position.

It emerges from the foregoing that the switching device, according to the invention, takes up little space, allows switches to be made between conveyors so that loads from another conveyor can be transferred at any angle. Furthermore, the switching device according to the invention is simple and easy to construct, is adaptable to existing conveyors, and provides numerous applications modifying the conditions under which a load moves on a roll conveyor.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention.

What is claimed is:

1. A switching device modifying conditions under which a load travels along a feed path on a first conveyor having a frame, a switching device comprising:

at least two parallel normal rolls mounted horizontally to the frame to form a support plane to transport the load;

at least two juxtaposed parallel switching rolls mounted horizontally to the frame downstream of the normal rolls relative to the feed path;

driving means connected to the normal and switching rolls for rotationally driving the normal and switching rolls in at least one rotational direction; and a connected flexible series of a plurality of links and rollers wound on and attached to an outer surface of each of the at least two switching rolls, an axis of rotation of the rollers having an angle of inclination in a range between 0 degrees and 60 degrees relative to an axis of rotation of the switching rolls, each roller having an outer diameter projecting beyond an outer diameter of a corresponding link to contact and support the load in the support plane.

2. The switching device according to claim 1, wherein the links include interconnecting outer links and inner links.

3. The switching device according to claim 2, wherein each of the inner and outer links further comprises:

a non-twisted center; and two twisted ends connected to the non-twisted center, wherein each twisted end has a twist angle relative to the angle of inclination of the axis of rotation of the rollers.

4. The switching device according to claim 3, wherein each outer link further comprises a lower bent tab integral with a bottom of the non-twisted center to attach said each outer link to an outer surface of the switching rolls.

5. The switching device according to claim 1, wherein the driving means comprise a first driving means and a second driving means, the first driving means rotationally driving the normal rolls in a non-reversible rotational direction, the second driving means rotationally driving the at least two switching rolls in a reversible rotational direction.

6. The switching device according to claim 1, further comprising:

a second conveyor attached transversely to the frame relative to the feed path, the second conveyor having an alternate feed path orthogonal to the feed path; and load restraining means for restraining the load moving along the feed path, the load restraining means being positioned downstream of the at least two switching rolls relative to the feed path, wherein the plurality of links and rollers attached to each of the at least two switching rolls are wound in a substantially similar direction and have a substantially similar angle of inclination.

7. The switching device according to claim 6, wherein the load restraining means is a vertically retractable stop retractable between a state above the support plane and a state below the support plane.

8. The switching device according to claim 7, wherein the load restraining means further comprises a fixed stop parallel to the feed path and orthogonal to the alternate feed path, the fixed stop being positioned at a downstream end of the alternate feed path.

9. The switching device according to claim 6, wherein the load restraining means is controllable from a remote location.

10. The switching device according to claim 6, wherein the at least two switching rolls comprise a first set of switching rolls and a second set of switching rolls located downstream of the first set of the switching rolls relative to the feed path, the plurality of links and rollers of the second set of switching rolls being wound on and attached to the outer surface of each of the second set of switching rolls such that the rollers of the second set of switching rolls have a winding direction that is opposite to a winding direction of the rollers on the first set of switching rolls.

11. The switching device according to claim 10, wherein the driving means comprise a first driving means and a second driving means, the first driving means rotationally driving the normal rolls and the first set of switching rolls, the second driving means driving the second set of switching rolls.

12. The switching device according to claim 11, wherein the first driving means rotationally drives the normal rolls and the first set of switching rolls in a non-reversible rotational direction and the second drive means rotationally drives the second set of switching rolls in a reversible rotational direction.

13. The switching device according to claim 12, wherein the second conveyor orthogonally intersects the first conveyor.

14. The switching device according to claim 1, wherein the angle of inclination of the rollers wound on each of the at least two switching rolls is substantially 0 degrees relative to the axis of rotation of the rollers, the at least two switching rolls being connected to a separate drive means than the drive means connected to the normal rolls, the separate drive means rotationally driving the at least two switching rolls at a speed different from a speed of the normal rolls.

15. The switching device according to claim 1, wherein the at least two switching rolls include a first switching roll and a second switching roll, the axis of rotation of the rollers on the first and second switching rolls having a substantially similar angle of inclination, the plurality of links and rollers on the first switching roll having a first winding direction, the plurality of links and rollers on the second switching roll having a second winding direction different from the first winding direction.

16. The switching device according to claim 15, wherein the first switching roll shares a common drive means with the normal rolls of the first conveyor, the common drive means rotationally driving the first switching roll and the normal rolls of the first conveyor in a non-reversible rotational direction, the second switching roll having a separate drive means, the separate drive means rotationally driving the second switching roll in a reversible rotational direction.

* * * * *